United States Patent [19]

Piestrup

[11] Patent Number: 5,107,508
[45] Date of Patent: Apr. 21, 1992

[54] X-RAY LASER

[75] Inventor: Melvin A. Piestrup, Woodside, Calif.

[73] Assignee: Adelphi Technology, Palo Alto, Calif.

[21] Appl. No.: 614,989

[22] Filed: Nov. 16, 1990

Related U.S. Application Data

[63] Continuation of Ser. No. 331,558, Mar. 30, 1989, abandoned.

[51] Int. Cl.$^5$ ............................................. H01S 3/30
[52] U.S. Cl. ............................................. 372/5; 372/2
[58] Field of Search ............................................. 377/5, 2

[56] References Cited

U.S. PATENT DOCUMENTS

| | | | |
|---|---|---|---|
| 3,822,410 | 7/1974 | Madey | 372/2 |
| 4,466,101 | 8/1984 | Schoen | 372/2 |
| 4,538,275 | 8/1985 | Szu | 372/2 |

OTHER PUBLICATIONS

M. A. Piestrup and P. F. Finman, "The Prospects of an X-Ray Free Electron Laser Using Stimulated Resonance Transition Radiation", IEEE J. of Quant. Electr., vol. QE-19, pp. 357-364 (Mar. 1983).

A. M. Fauchet, J. Feinstein, A. Gover, R. H. Pantell, "Visible and Ultraviolet radiation generation using a gas-loaded free-electron laser", IEEE J. of Quant. Electr., vol. QE-20, pp. 1132-1341, Dec. 1984.

Norman M. Kroll and Wayne A. McMullin, "Stimulated emission from relativistic electrons passing through a spatially periodic transverse magnetic field", Phys. Rev. A, vol. 17, pp. 300-308 (1978) (Jan. 1978).

R. M. J. Cotterill, "A universal planar X-ray resonator", Appl. Phys. Lett., vol. 12, pp. 403-404, 1968 (Jun. 15, 68).

H. Kogelnik and C. V. Shank, "Stimulated Emission in a Periodic Structure", Appl. Phys. Lett, vol. 18, pp. 152-154, Feb. 1971.

M. L. Cherry, G. Hartman, D. Muller, and T. A. Prince, "Transition radiation from relativistic electrons in periodic radiators", Phys. Rev. D, vol. 10, pp. 3594-3607, Dec. 1974.

M. L. Ter-Mikaelian, "Emission of fast particles in heterogeneous medium", Nucl. Phys., vol. 24, pp. 43-66, Apr. 1961.

M. A. Piestrup, P. F. Finman, A. N. Chu, T. W. Barbee, Jr., R. H. Pantell, R. A. Gearhart, F. R. Buskirk, "Transition Radiation as an X-Ray Source", IEEE Quant. Electr., vol. 19, pp. 1771-1781, Dec. 1983.

G. M. Garibyan, L. A. Gerogyan, and C. Yang, "X-ray transition radiation produced in an irregular medium", Sov. Phys. JETP, vol. 39, pp. 265-270, Aug. 1974.

M. J. Moran, B. A. Dahling, P. J. Ebert, M. A. Piestrup, B. L. Berman, and J. O. Kephart, "Measurement of Coherent Transition X-Rays", Phys. Rev. Lett., vol. 57, pp. 1223-1226, Sep. 1986.

M. A. Piestrup, D. G. Boyers, Qiang Li, M. J. Moran, F. R. Buskirk, M. M. Johnson, J. Neighbors, and D. J. Snyder, "Detection of coherent transition radiation and its application to beam diagnostics and particle identification", IEEE Trans. Nuc. Sci., vol. 35, pp. 464-469, Feb. 1.

*Primary Examiner*—Léon Scott, Jr.
*Attorney, Agent, or Firm*—Joseph H. Smith

[57] ABSTRACT

A tunable generator or amplifier of intense, collimated, monochromatic electromagnetic radiation includes primarily of a relativistic electron beam, a periodic medium, a periodic magnet or electromagnetic field, a vacuum housing, and, in the primary embodiment, a ring resonator. An accelerator provides a high current, relativistic electron beam which interacts with an electromagnetic wave in a periodic magnetic field and a periodic medium to achieve periodic phase synchronizism between the phase velocity of the electromagnetic wave and the velocity of the said electron beam. The said periodic phase synchronization results in the bunching of the electron beam and the amplification of the electromagnetic wave. In the primary embodiment the growing wave is returned back to the interaction region via Bragg reflectors. The wave continues to grow on each pass through the interaction region formed by the periodic medium and magnetic field. In this primary embodiment, part of the said growing wave can be transmitted through one of the Bragg reflectors which is only partially reflective. In this way the electromagnetic wave can be out into the external environment.

11 Claims, 7 Drawing Sheets

X-RAY LASER

CROSS REFERENCE TO RELATED APPLICATION

This is a continuation of application Ser. No. 331,588 filed Mar. 30, 1989, now abandoned.

TECHNICAL FIELD

This invention relates to an apparatus for the production and amplification of collimated, monochromatic electromagnetic radiation for technological, scientific, medical and national defense purposes.

BACKGROUND AND SUMMARY OF THE INVENTION

In the prior art, the free electron laser (called hereinafter the vacuum free electron laser) is a source of monochromatic, collimated, tuneable electromagnetic radiation (see U.S. Pat. No. 3,822,410 by John M. J. Madey, issued July 2, 1974). It has already been operated in the microwave, infrared, and optical portions of the spectrum. Its operation is entirely different from conventional lasers because it uses *free* or unbound electrons instead of electrons *bound* to atomic nuclei. In its primary embodiment, the vacuum free electron laser consists of four main elements: (1) a vacuum container, (2) a periodic magnet, (3) a electron beam of relativistic electrons, and (4) an optical cavity consisting of two coaxial parallel mirrors. The mirrors form an optical resonator whose axis is coaxial with that of the periodic magnetic field. The beam of electrons passes through the periodic-magnetic field along the axis of the optical resonator. The periodic magnet field is designed such that the velocities of the electromagnetic wave and the electron beam are periodically synchronized resulting in energy exchange between the wave and the electrons. This exchange causes the electrons to pack up into small bunches whose size is on the order of the optical wavelength. It also causes the optical wave to gain intensity as it traverses the length of the cavity. As in a conventional laser, the optical-resonator mirrors feed back part of the radiation to the electron beam. Part of the radiation is released through one of the mirrors, which is partially transmitting.

The vacuum free electron laser has excited interest for a number of reasons, one of which is that it might operate in the vacuum-ultraviolet and soft-x-ray regions of the spectrum. However, the small-signal gain does not improve with shorter wavelength, and excessively long periodic magnetic fields (wigglers) and high currents are necessary to obtain sufficient gains for operation. Furthermore the operating wavelength is further restricted by the period of the magnetic field, which is practically limited to periods of 5 mm or greater. Increasing the energy of the electron beam may result in shorter wavelength generation, but this technique lowers gain if the current is not increased.

In the prior art, another proposed x-ray laser is the stimulated transition radiation free electron laser. This is a free electron laser that uses a periodic medium to couple the electromagnetic radiation to the electrons. (See M. A. Piestrup and P. F. Finman, "The prospects of an x-ray free electron laser using stimulated resonance transition radiation," IEEE J. Quant. Electr., pp. 357–364, March, 1983). This device replaces the periodic-magnetic field with a periodic medium, with the additional provision that the optical axis of this laser is at an oblique angle to the electron beam. As in the case of the vacuum free electron laser, the electromagnetic wave and the electron beam couple (or phase match) periodically at the interfaces of the alternating media (see FIG. 1). Energy is exchanged resulting in a growing electromagnetic wave and in bunching of the electrons in packets whose longitudinal dimensions are on the order of the wavelength of the electromagnetic wave. As in the vacuum free electron laser, this synergistic interaction of waves and electrons results in the gain or increase of the wave in a particular direction. The process is termed synergistic in that both bunching of the electrons and a corresponding increase in the wave occur simultaneously.

An important drawback of the stimulated transition radiation free electron laser is that the optical-resonator axis must be at a oblique angle to the direction of the electron beam. Thus, the overlapping optical and electron paths are restricted and the interaction length is limited, resulting in small gain per pass of the electromagnetic radiation as it bounces between the mirrors.

The present invention solves the overlap problem. By wiggling or spiraling the electrons in the periodic medium, it is possible to achieve longer overlap of the electron beam and the optical mode and produce large gains of the electromagnetic radiation per pass in the optical resonator. By setting the pitch angle of the wiggler equal to the cone angle of the resonance transition radiation, the wiggler period can be large. In the prior art, the vacuum free electron laser wiggler period was too small to be physically realized at x-ray wavelengths. The present invention resembles a vacuum free electron laser with the vacuum replaced by a periodic medium. The optical mode travels along the axis of the wiggler. The device, herein after called the periodic medium loaded free electron laser, is shown in FIG. 2.

In order to understand the present invention and the effect of combining the periodic magnetic field and the periodic medium, it is important first to understand the prior art of x-ray photon generation from a single electron impinging on a periodic foil stack (See M. Ter-Mikaelian "Emission of fast particles in heterogenious medium", Nuc. Phys., vol. 24, pp. 43–66, April 1961). As shown in FIG. 3, when an electron impinges on a foil stack, it creates an x-ray pattern in the form of a cone in the forward direction. If the foil stack is designed such that the foils are accurately and periodically placed relative to one another (FIG. 4), then the radiation created at each foil interface will add in particular directions causing the cone to break up into a number of concentric cones (FIG. 3). If this radiation pattern were viewed along the axis, it would appear as a set of concentric rings (a "bullseye" pattern). Each ring corresponds to a single resonance cone angle, $\theta_r$, whose various angles are designated by the integer r=1,2,3 ... To see how this happens and referring to FIG. 4, image an electron emitting a wave at an interface, the electron and the wave continue on at differing velocities to the next interface where another wave is produced by the electron. The two waves will add at a particular angle, $\theta_r$, if the electron has slipped in phase an intergral number of wavelengths relative to the first wave.

The laser of Piestrup and Finman requires setting the mirrors at the angle of phase addition, $\theta_r$, (called the resonance angle) in order to feed the x rays back on to the electron beam so that stimulated emission can occur. The interaction length of the electrons and photons is then limited because the photon and electron beams are not concentric. On the other hand, in the present invention, the electrons spiral in a helix so that the pitch angle of the helix is equal to one of the resonance angles. As shown in FIG. 5, this congruence makes the edge of one of the radiation cones lie along the axis of the optical resonators thus extending the length of the interaction. The result is greater efficiency and a larger increase in the x-rays as they traverse the foil stack (a larger single pass gain).

FIG. 5 shows the side and on-axis views of the trajectory of the electron and the rotation of the radiation cone around the optical axis of the resonator (z-axis). The electron starting at $T_1$ emits a cone of radiation A, the next cone is emitted at $T_2$ with a cone of radiation coming out at position B. The process continues as the electron emits at $T_3$ and $T_4$ with emission cones at C and D, respectively. The figure shows the pitch angle of the electron helical motion is such that it is equal to the angle of the radiation cone's apex angle. Thus the edge of the cone always lies on the optical axis of the resonator.

Another allied device to present invention is the gas-loaded free electron laser, which utilizes Cerenkov radiation rather than transition radiation (See A. M. Fauchet, J. Feinstein, A. Gover, R. H. Pantell "Visible and Ultraviolet radiation generation using a gas loaded free electron laser" IEEE J. Quant. Electr., vol. QE-20, pp. 1132–1341, December 1984). These devices all have identical small-signal gain expressions but differing phase-matching conditions. The gas loaded free electron laser has a more physically realizable wiggler period at short wavelengths than that of the vacuum free electron laser. However, the gas loaded free electron laser is confined to regions of the spectrum where the index of refraction of the gas is greater than one ($n > 1$), thus limiting the device to optical and vacuum-ultraviolet regions of the spectrum (the possible exception is the use of some materials in the x-ray region near their K-shell photoabsorption edges where the index of refraction may be less than 1). The periodic medium loaded free electron laser of the present invention has no such restriction, and may operate throughout the x-ray region of the spectrum.

Although it may appear that the periodic medium is the only different structural element between the present invention and the vacuum free electron laser, it is most important to note that the photon-generation mechanisms of the vacuum free electron laser, the gas loaded free electron laser and the present invention are all fundamentally different. The vacuum free electron laser employs radiation emitted by a relativistic electron beam which moves through a periodic magnetic field. This radiation is called synchrotron radiation. In the gas loaded free electron laser, photon emission occurs because the electron is traveling in a homogenious medium. This radiation is called Cerenkov radiation. In the present invention, the photon emission occurs when an electron impinges on the interface between two media of differing density. This radiation is called transition radiation. Although the present device also emits synchrotron radiation because the electron beam is bent, in most embodiments the frequency of the synchrotron radiation would be much lower that the frequency of the emitted transition radiation. The phase-matching condition of the present invention is designed to cause stimulated emission at the higher frequencies. Therefore, although these lasers may appear somewhat similar in structure, they are fundamentally different in their method of photon generation.

In accordance with the preferred embodiments of the invention, an intense, well-collimated, monochromatic x-ray source is provided which uses a periodic medium and periodic magnetic field to achieve periodic phase synchronization between an electromagnetic wave and a relativistic electron beam. The resulting interaction produces amplification of the electromagnetic wave from the electromagnetic noise emitted spontaneously in the device.

The present device can be used as an amplifier or oscillator for generating coherent radiation that can operate at frequencies within the x-ray, ultraviolet, optical, and infrared regions of the spectrum. In its broader aspect, the present invention provides an apparatus for the amplification of radiation emitted spontaneously in the device itself or injected from an external electromagnetic radiation source. The apparatus includes elements for generating a high-energy electron beam, an element for periodically deflecting the electron beam and an element for periodically altering the phase velocity of the radiation to thereby establish a periodic phase-matching condition between the phase velocity of the radiation and the velocity of the electron beam. A synergistic interaction between the radiation and the electron beam occurs resulting in an increase in the electromagnetic radiation and periodic bunching of the electron beam. In a preferred embodiment of the invention, the deflection element includes a helical magnetic field which causes the injected electron to follow a helical trajectory. The elements for periodically altering the phase velocity of the electromagnetic radiation is accomplished by thin foils placed periodically along the axis of the helical magnetic field.

The synergistic interaction occurs if there is proper phase matching between the electromagnetic wave and the electron beam. The most important criterion for such matching to take place is called the phase-matching condition. This gives a dimensional relationship between the period of the magnetic field, $\lambda_\omega$, the wavelength of the electromagnetic radiation, $\lambda$, the pitch of the helix, $\theta_p$, and the resonance angle of the periodic medium, $\theta_r$. In its simplest form for this preferred embodiment:

$$\lambda_\omega = \frac{\lambda \cos\theta_p}{\sqrt{\epsilon'}\,(\cos\theta_r - \cos\theta_p)}$$

where $\sqrt{\epsilon'}$ is the average dielectric constant of the periodic medium.

The mechanical specification of the periods of the medium and magnet field are given by a phase-matching condition which will be derived here. This condition is a fundamental equation for free electron lasers and differentiates the various methods for free electron laser operation and determines wavelength of emission.

The present invention is based on the realization that when a high-energy electron impinges on an interface between two media of differing densities, it emits electromagnetic radiation. Such radiation is called transition radiation. Viewed quantum mechanically, photons are emitted at the interface and simulateously therewith the electron recoils. The recoil, though minute, distinguishes the relationship between the electron and photon in the emitted radiation at that energy. Thus, the emission and absorption spectra do not quite overlap and there will always be a range of frequencies for which the transition rate of emission exceeds the rate of absorption. Electromagnetic radiation can be present in the present device either by injection or by the spontaneously emitted transition radiation at the interfaces. When the radiation is present in the electron beam, the emission and absorption rates increase in proportion to the number of photons per unit volume. At those frequencies for which the rate of emission exceeds the rate for absorption there will be, on the average, more photons emitted than in the absence of the radiation. Therefore, as in a conventional laser, the present invention obtains stimulated emission.

This quantum mechanical explanation is similar to the Madey description of the gain mechanism of the vacuum free electron laser, except the present invention's method of photon production are due to transition radiation. However, this simple quantum-mechanical explanation neglects the fundamental importance of the periodic medium's alteration of the phase-matching condition between the electron beam and the radiation. It is this alteration which permits the electromagnetic wave to grow.

A more useful description is obtained by a classical description of the gain mechanism. Amplification occurs as a consequence of the synergistic interaction between the electron beam and the wave as shown by J. R. Pierce in Traveling Wave Tubes (Van Nostrand 1950). Classical analysis was done for the vacuum free electron laser by Knoll and Mc Mullin in "Stimulated emission from relativistic electrons passing through a spatially-periodic transverse magnetic field", Phys. Rev. A, vol. 17, pp. 300–308, January 1978, and for the stimulated transition free electron laser by Piestrup and Finman. These results are important because they describe various possible parameter regimes (also called gain regrimes) where amplification or gain is possible. These regrimes mainly depend upon whether the velocity spread of the electron beam is large or small, or whether the current density of the beam is large or small. The present invention also has a variety of operational gain regimes. However, in the most perferred embodiment of the invention, the small-signal regime is the most likely to give good gain. The present invention provides a laser which can operate at frequencies that are currently unattainable with prior art free electron lasers and conventional lasers. A tunable x-ray laser would be useful in many areas, including x-ray spectroscopy, medical imaging, x-ray lithography, holography, and microscopy. The present invention can be easily tuned and has the possibility of both high average and high peak powers.

In summary, an important objective of the present invention is to provide a source of collimated and monochromatic short wavelength and x-ray radiation for scientific research, for industrial applications such as x-ray micro lithography and microscopy and for a directed high-energy x-ray beam. No such x-ray free electron laser now exists.

An advantage of the present invention over the vacuum free electron laser is that, for short wavelength and x-ray operation, the addition of the periodic medium permits physically realizable wiggler parameters such as wiggler period and magnetic field intensity. These wiggler parameters permit a greater gain for x-ray radiation.

An advantage of the present invention over the stimulated-transition-radiation free electron laser is that in present invention the electron beam and electromagnetic radiation can be coaxial resulting in larger gains per pass of the electromagnetic radiation as it traverses the laser.

An advantage of this invention over the gas loaded free electron laser is that this device can operate in the x-ray region on the spectrum, while, the gas loaded free electron laser cannot. The gas loaded free electron operation is confined to regions of the spectrum where the index of refraction of the gas is greater than 1.

DESCRIPTION OF PREFERRED EMBODIMENT

Figure 1:
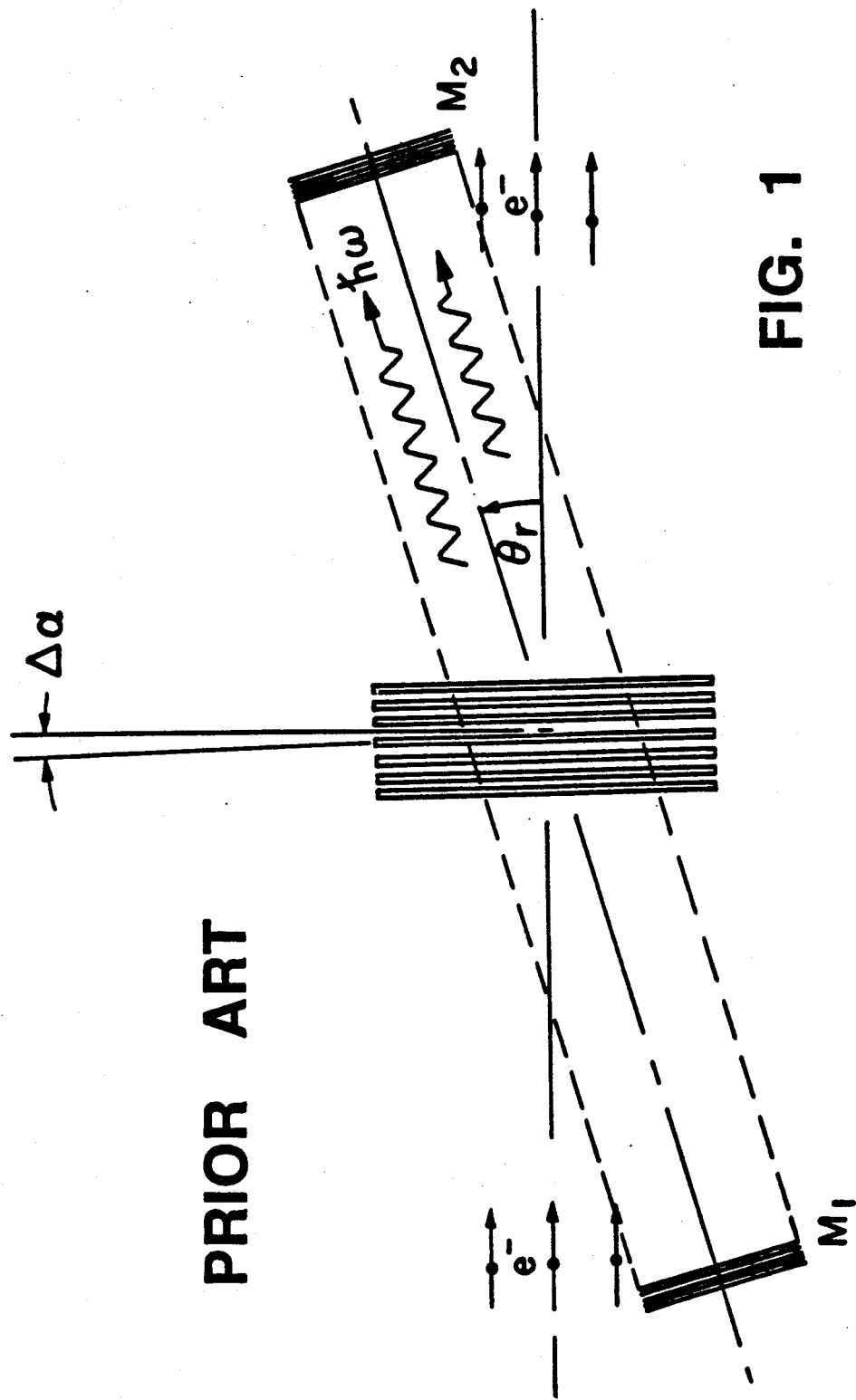
FIG. 1 (Prior Art) is a schematic diagram of a x-ray laser that uses stimulated resonance-transition radiation which requires the optical axis of the resonator to lie at an oblique angle to the direction of the electron beam and thus limits the overlap of the optical and electron beams.
Figure 2:
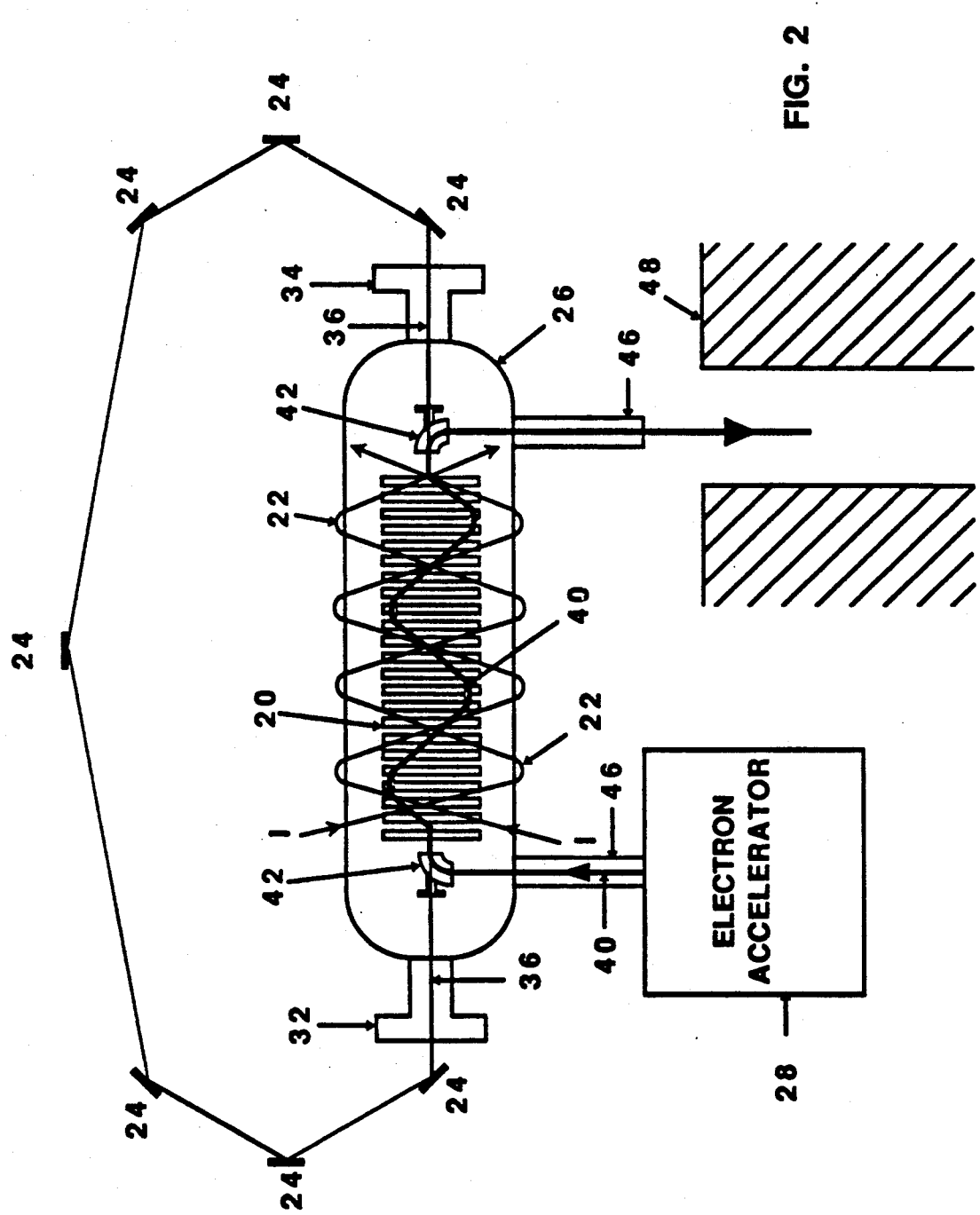
FIG. 2 is a schematic diagram of a periodic medium loaded free electron x-ray laser whose electron and optical beams are coaxial, giving larger gain per pass.

FIG. 2 shows a laser which employs an electron beam 40 obtained from an accelerator 28. The electron beam is relativistic with $E > 1$ MeV, and it's emittance, $\epsilon$, (the product of the beam angular divergence and beam area) is sufficiently small such that $\epsilon < \lambda$. The electron beam 40 is injected into a helical magnet 22 by an injection magnet 42 and is extracted by an extraction magnet 44 after the beam has traversed the helical magnetic field 23. The electron beam 40 enters a helical magnetic field 23 produced by the helical magnet 22 and periodically interacts with a periodic medium composed, in this embodiment, of foils 20 separated by a vacuum. The interaction of the foils 20 and the electron beam 40 result in the spontaneous emission of electromagnetic radiation 36 which is then fed back via the Bragg reflectors 24 onto the beginning of the electron beam 40. This interaction of the electron beam 40 and the electromagnetic wave 36 results in a synergetic process in which the beam 40 bunches and the electromagnetic wave 36 grows. The electromagnetic wave 36 builds up after many passes through the laser. Radiation can be extracted by allowing one of the Bragg reflectors 24 to be partially transparent, and allowing some of the radiation 38 to escape. The Bragg reflectors 24 can be located inside or (as shown) outside the vacuum chamber 26. The Bragg reflectors 24 form a ring which feeds the growing wave 36 back onto the electron beam 40. In this embodiment, the radiation 36 is allowed to enter and leave the vacuum chamber 26 through windows 32 and 34, respectively, which are transparent to the generated radiation 36.

In the preferred embodiment, an x-ray resonator is used to feed back the radiation onto the electron beam. X-ray resonators of this type take the form of sets of single crystals arranged in such a way that the rays form a closed path by undergoing successive Bragg reflections from individual crystals. The reflectivity at the Bragg angle can approach unity. Various arrangements of Bragg crystals have been proposed. See W. L. Bond, M. A. Duguay, and P. M. Rentzepis in "Proposed resonator for an x-ray laser," Applied Physics Letters, vol. 10, p 216–218 (1967) which discusses a ring of crystals which have equal Bragg angles. This arrangement has some losses and the Bragg angles that can be used are restricted. Another example is provided in R. M. J. Cotterill "A universal planar x-ray resonator", Applied Physics Letters, Vol. 12, pp. 403–404, (1968) which uses an even number of reflector pairs which are parallel. In this arrangement all reflections are exactly at the same Bragg angle $\theta$, and the resonator is both planar and tunable. The resonator can be used for different wavelengths. Other arrangements are possible using multiple reflectors.

The mirrors or Bragg reflectors 24 may not be necessary for oscillation if the gain is high enough. In such an event substantial amplification takes place in a single pass through the device. Thus the reflectors 24, which serve in part to extend the interaction time of the electromagnetic wave 36 and the electron beam 40, can be eliminated.

In another embodiment the mirrors lie parallel to one another and on the axis of the helical magnet 22 and periodic medium 20. The radiation bounces between the two mirrors. Soft-x-ray mirrors of this type have been constructed by T. W. Barbee Jr. see T. W. Barbee Jr., "Multilayers for x-ray optical applications," Springer Series in Optical Sciences, vol. 43: x-ray Microscopy, ed. G. Schmahl and D. Rudolph, pp. 144–162, 1984.

In another embodiment the foils not only provide a periodic medium to achieve periodic phase-addition between the electromagnetic wave and the electron beam, but also provide the feedback necessary for the build-up of oscillation. In a conventional optical laser the resonator is commonly formed by two end mirrors. In this preferred embodiment, the foils partially reflect back some of the radiation at each foil interface. Thus this new preferred embodiment can be a mirrorless device with the feedback mechanism distributed throughout and integrated with the gain medium. This type of feedback for dye and semiconductor lasers is described by H. Kogelnik and C. V. Shank in "Stimulated emission in a periodic structure," Applied Physics Letters, vol. 18, pp 152–154, February, 1971.

Since the foils themselves can not reflect much of the radiation, they can be coated with thin alternating layers of differing materials to cause them to reflect a greater percentage of the radiation. For example, a mirror-foil combination is made up of a 1-$\mu$m substrate of Al coated with a 10 alternating layers of Mg and C of thickness of 100 and 60 angstroms, respectively. Using mulitlayer mirrors coated on thin foil radiators as discussed in Barbee make this possible. In this embodiment the electron beam would pass through both the mirror and the foil.

The electron beam is enclosed in a vacuum chamber 26 which includes arms 46 connecting the device with the accelerator 28 in order to minimize scattering of the electrons. After the interaction the electron beam is deposited into a beam dump 48, e.g. hole in the floor, for radiation safety. In another embodiment, it can be reintroduced back into the accelerator 28 where it is recycled back into the laser. When recirculating the electrons, the accelerator supplies only that energy which was lost when the electron beam passed through the periodic medium and magnetic field. This results in greater overall power efficiency, in contrast to the primary embodiment which discards the electron beam.

In other embodiments, both the period of the medium 20 and period of the magnetic field 22 can be adjusted along the length of the laser, a technique which will compensate for the energy loss of the electrons as they radiate and improve the efficiency of the device. The adjustment can include breaking both the periodic magnetic 22 and the periodic medium 20 into groups of two or more so that the spacing between the groups is much larger than their respective periods. This division allows the electrons to drift and bunch between their groups, resulting in higher gain and greater photon production efficiency.

A modified vacuum free electron laser which has broken up the periodic magnet into three sections is called the optical klystron, and is discussed by P. Elleaume in "Theory of the Optical klystron," Nuclear Instruments and Methods in Physics Research, vol. A250, pp. 220–227, 1986. The optical klystron was proposed as a device which increases the gain of the vacuum free electron laser when the total device length is limited. The optical klystron is divided into three sections: the modulation section, the dispersion or drift section, and the extraction section. It resembles an ordinary vacuum free electron laser broken into two pieces with an intervening space. As in all free electron lasers, the electron beam and wave interact when there is phase matching, this is allowed to occur in the modulation section where the electron velocity is modulated over a short distance. The electrons are allowed to drift where, because of the initial velocity change, they bunch. The extraction section then causes the wave again to be phase matched to the velocity of the bunched beam. The velocity modulation of the modulation section was been changed into current modulation in the drift section and increased electromagnetic radiation is then extracted in the extraction section.

In another device that is similar to the optical klystron, Deloney, Feinstein and Pantell in "Characteristics of the dispersive free electron laser," IEEE Quant. Electr. vol. QE-21, pp. 1037–1040, July 1985, describe a dispersive free electron laser which resembles the optical klystron in that it contains three sections that device was designed to increase the allowable energy spread of the input electron beam while still maintaining high gains.

In the present invention, the periodic medium loaded free electron laser, can also be divided up into three sections and made into an optical klystron or a dispersive free electron laser. This would increase the gain.

These various embodiments of the optical klystron all have the three sections but uniquely differ in their methods of phase matching the electron beam velocity to the wave velocity. As with the vacuum free electron laser, the addition of a periodic medium into the optical klystron and the dispersive free electron laser alters the phase-matching condition and permits the device to operate in the x-ray region of the spectrum. The phase matching condition for the present invention uniquely defines these embodiment of the present invention.

The x-ray periodic medium loaded klystron operates similar to the periodic medium loaded free electron laser. The device is identical with the addition of the drift space 52 composed, in this imbodiment, of dog leg magnets 50 and short vacuum drift lengths. The use of dog leg magnets to shorten and control the drift length is discussed by Elleaume.

Figure 7:
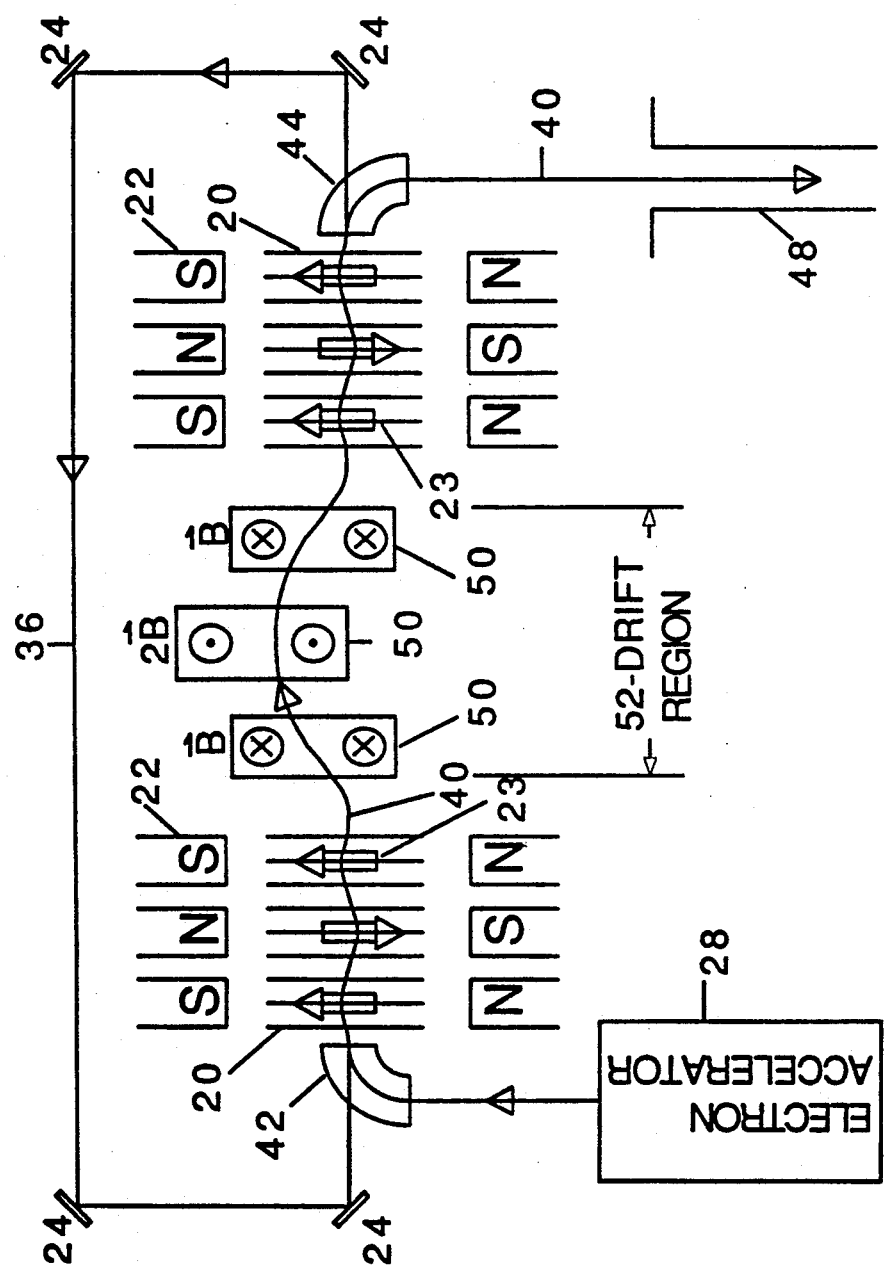
FIG. 7 is a schematic diagram of a periodic-dielectric-loaded klystron.

FIG. 7 shows a periodic medium loaded free electron klystron. An electron beam 24 is injected into a helical magnet 22 by an injection magnet 42 where it traverses the first half of a periodic magnetic field 23 and periodic medium composed of foils 20 separated by a vacuum. The interaction of the foils 20 and electron beam 40 results in the spontaneous emission of the electromagnetic radiation 36 which is then fedback via the Bragg reflectors 24 onto the beginning of the electron beam 40. This interaction of the electron beam 40 and the electromagnetic wave 36 results in the electron beam 40 being velocity modulated in a coherent fashion depending upon the phase of the electromagnetic radiation 36 and velocity of the electrons. The electrons then exit the periodic magnetic field and into a drift section 52 composed of three dog leg magnets 50. The velocity modulation introduced by the first interaction in the first set of magnets results in the electrons bunching in the drift section 52. The longitudinal dimension of the bunch being on the order of the wavelength of the electromagnetic wave 36. The bunched electrons then travel on into the next section where they again interact with the electromagnetic radiation resulting in the electromagnetic radiation growing. The electromagnetic radiation 36 builds up after many passes through the laser. As in the case of a periodic medium loaded free electron laser, radiation can be extracted by allowing one of the Bragg reflectors 24 to be partially transparent, and allowing some of the electromagnetic radiation 38 to escape.

OPERATION OF INVENTION

In order to operate, it is important that the invention be designed with parameters so that the synergistic interaction of an electromagnetic wave and electron beam results in the electromagnetic wave growing and the electron beam bunching. For this bunching to occur, the period of the magnetic field, $\lambda_\omega$, and the period of the medium, $l_r$, must relate to one another in the pahse-matching relationship:

$$\lambda_\omega = \frac{\lambda Cos\theta_p}{\sqrt{\epsilon'}\ (Cos\theta_r - Cos\theta_p)}$$

Since this relationship most clearly defines an important concept of the invention and separates it from other types of free electron lasers, it will be derived subsequently.

In the transition radiation free laser and in the present invention the sudden change of the dielectric constant or the periodic change of the dielectric constant limits or periodically limits the interaction of the electromagnetic wave. Such changes allows periodic exchanges of energy and momentum between the wave and the electron beam. The minimum distance over which an electromagnetic wave and a charged particle can exchange energy is called the formation length, and is given in a paper by M. L. Cherry, D. Muller, and T. A. Prince, "Transition Radiation from a relativistic electrons in periodic radiators," Phys. Rev. D., vol. 10, pp. 3594–3607, December 1974. In two different media, the formation length $Z_i$, where $i=1,2$ is given by:

$$Z_i = \frac{2c}{\omega(1-\beta\sqrt{\epsilon_i - \sin^2\theta})} \approx \frac{4\lambda\beta}{\frac{1}{\gamma^2} + \theta^2 + \left(\frac{\omega_i}{\omega}\right)^2} \quad (1)$$

where $\gamma = (1-\beta^2)^{-\frac{1}{2}}$, $\epsilon_i = 1 - (\omega_i/\omega)^2$ are the permittivities of the two media, $\omega_i (i=1,2)$ are their respective plasma frequencies, $\beta = v_e/c$, $v_e$ is the speed of the electron, c the speed of light, $\lambda = c/\omega$ and $\theta$ is the angle of emission. Hence there is emission at the interface if the material thickness on both sides of the interface is on the order of $Z_1$ and $Z_2$ or greater. For moderate-energy electron beams, formation lengths between 0.18 and 5 $\mu m$ have been used.

Figure 3:
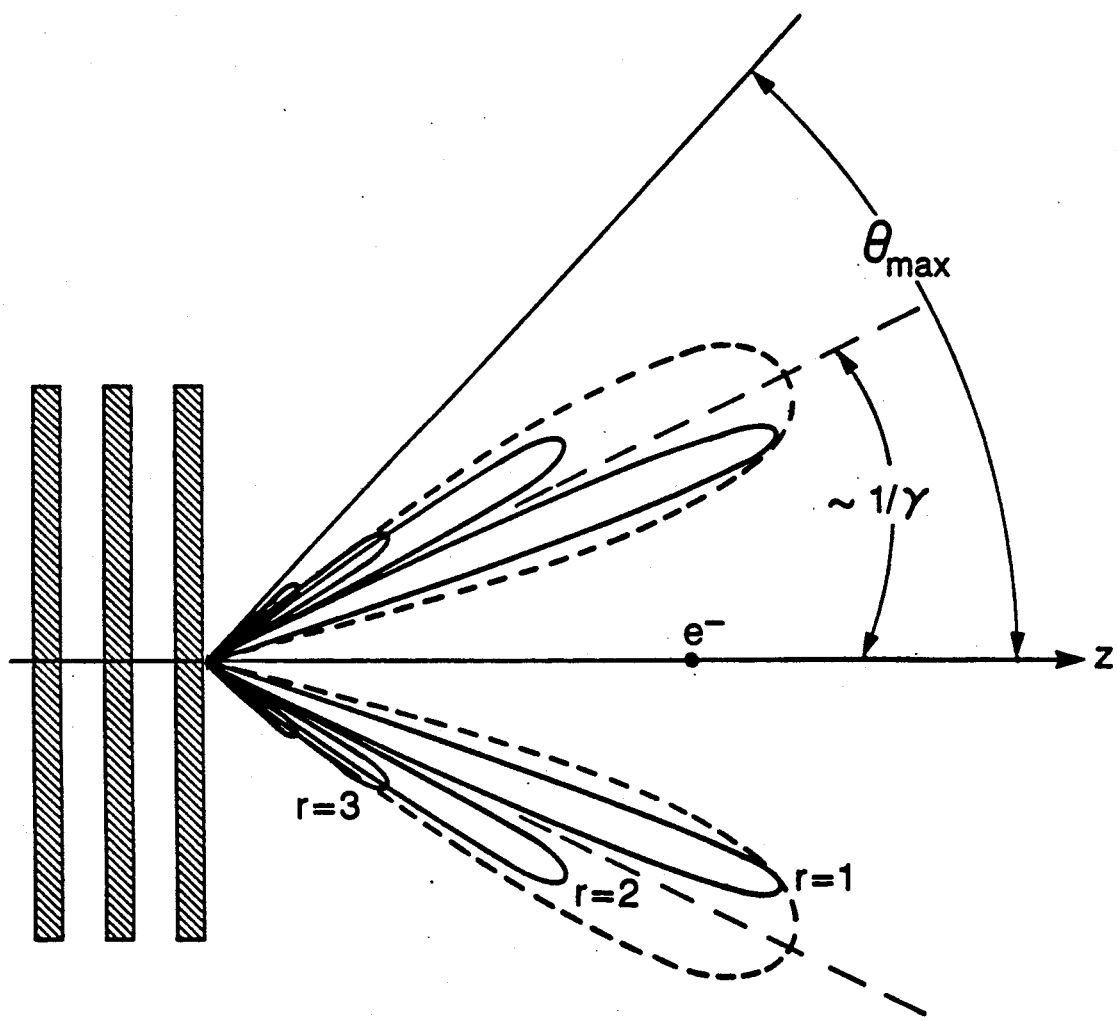
FIG. 3 is a schematic diagram of transition radiation from a foil stack showing both the incoherent emission, which is emitted in a small forward cone with apex angle $\theta = 1/\gamma$, and the coherent emission, where the inter-foil phase addition of the radiation results in the lobe pattern breaking up into smaller lobes.
Figure 4:
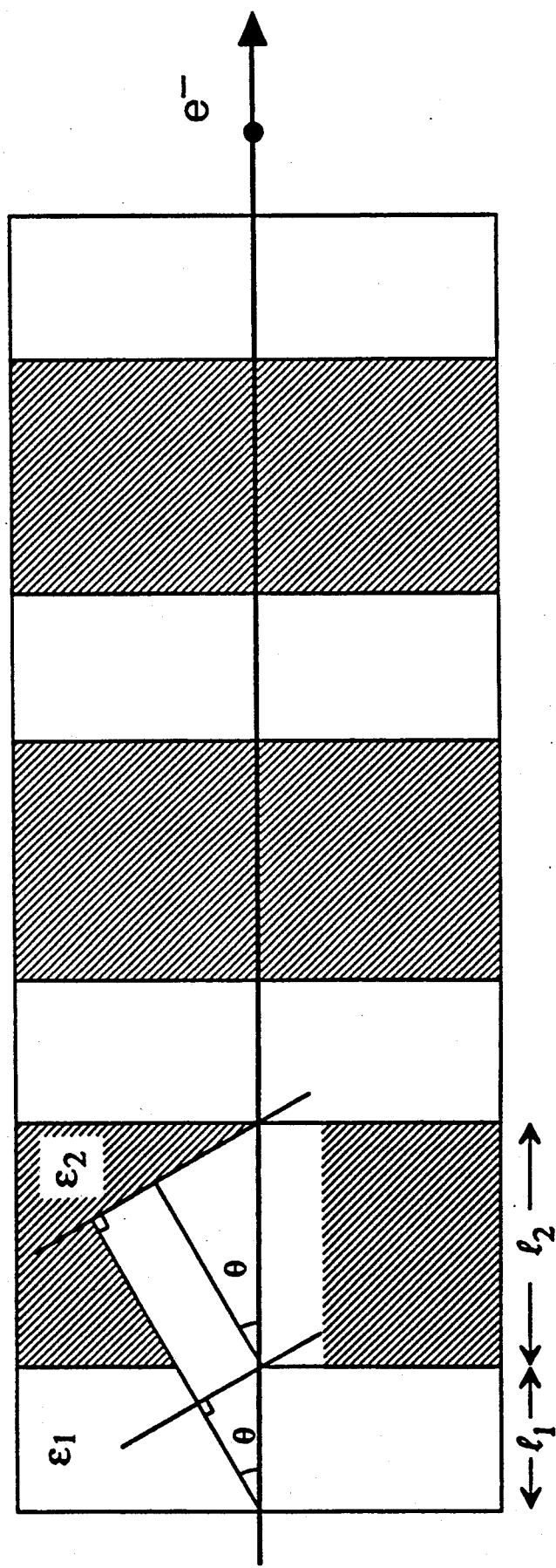
FIG. 4 is a schematic diagram illustrating the phase addition of waves that have been emitted at each interface of a medium.
Figure 5:
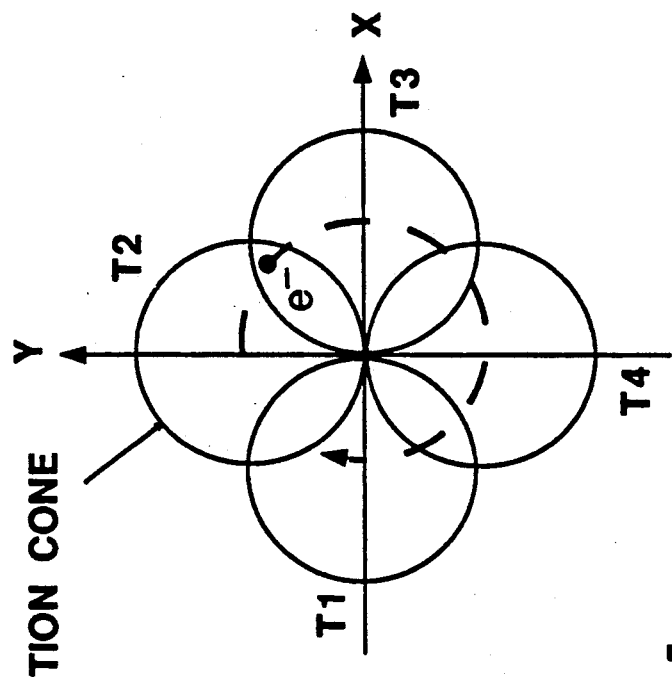
FIG. 5 is a schematic diagram illustrating the helical motion of an electron in a periodic magnetic field and how the edge of the transition radiation cone is layed along the optical axis.
Figure 5:
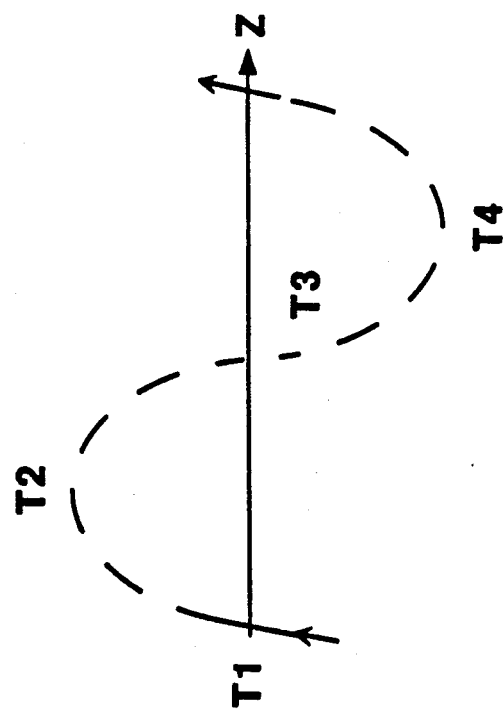

The most probable emission angle, $\theta_o$, from a single interface is given by Cherry et al.:

$$\theta_o \approx \sqrt{\frac{1}{\gamma^2} + \left(\frac{\omega_1}{\omega}\right)^2} \quad (2)$$

where $\omega_1$ is the plasma frequency of the interfoil gas. If there is a vacuum between the foils then $\omega_1 = 0$ and $\theta_o \approx 1/\gamma$. There may be considerable intensity, however, up to the angle as given by Cherry et al.

$$\theta_{max} \approx \sqrt{\frac{1}{\gamma^2} + \left(\frac{\omega_2}{\omega}\right)^2} \quad (3)$$

where $\omega_2$ is the plasma frequency for the foils (see FIG. 3). In the derivation of the gain for the present invention, it will be found that the gain varies as $\theta^4$, thus, in the preferred mode the emission angle should be as close as possible to $\theta_{max}$ to ensure the largest gain.

To derive the phase-matching condition for the periodic medium loaded free electron laser, it is important to first derive the condition for phase addition of photons generated at each interface of a periodic medium for an electron impinging on the medium at an angle of $\theta_p$. In this preliminary calculation, the electron is moving uniformly in one direction (no wiggler).

Figure 6:
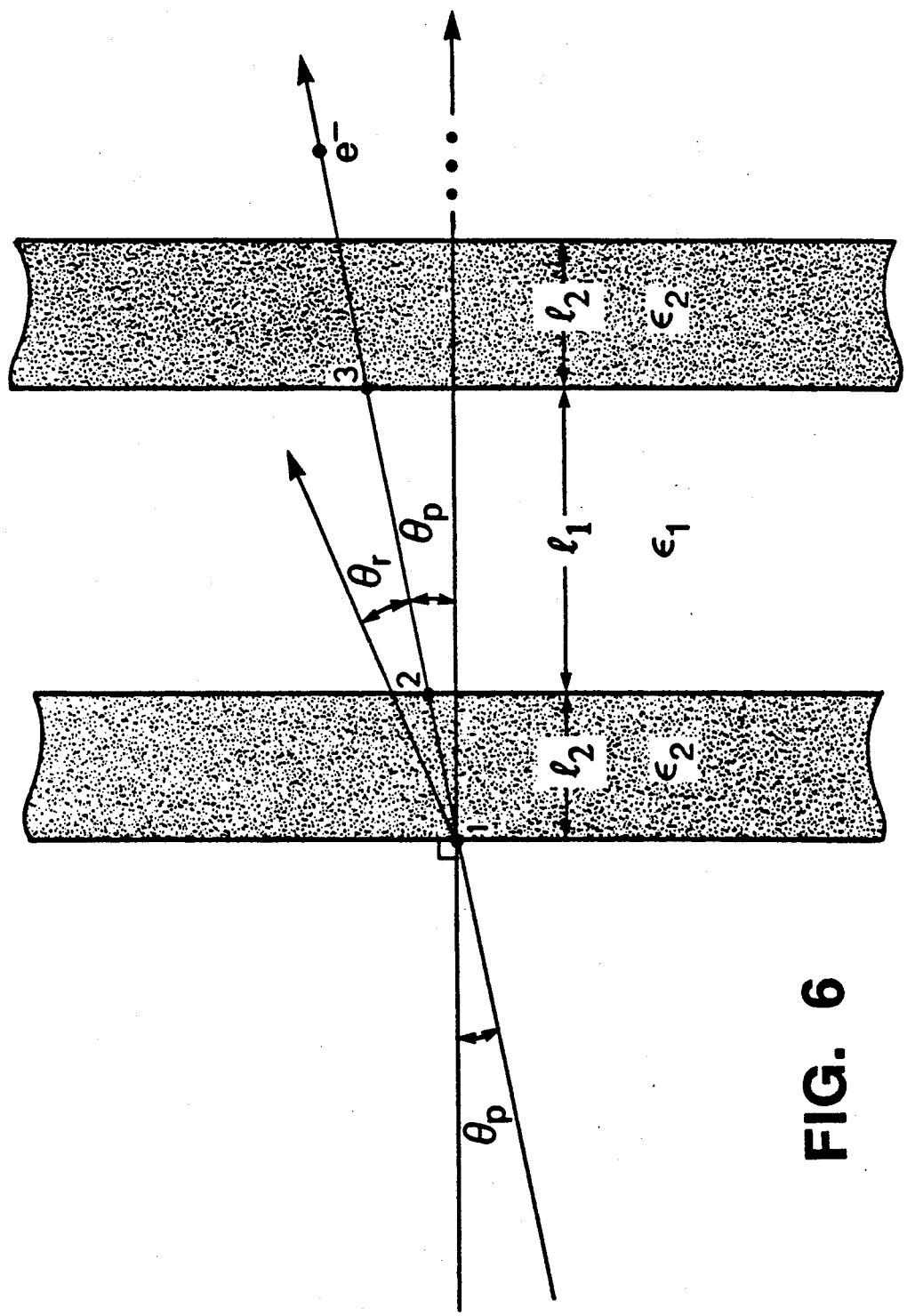
FIG. 6 is a schematic diagram of an electron impinging on a foil stack used to calculate the phase-matching condition for a periodic medium loaded free electron laser.

As illustrated in FIG. 6, in the time, $\Delta t$, such that, $$\Delta t = \frac{l_1 + l_2}{v_e Cos\theta_p}, \quad (4)$$

the electron has moved from point 1 to 3. Assuming that the electron will emit photons at positions 1, 2, and 3, the photon at point 1 will take a time $\Delta t_1 = l_1\sqrt{\epsilon_1}\ Cos\ \theta_r/c\ Cos\ \theta_p$ to traverse $l_1$. Similarly for a photon emitted at point 2, it will take a time $\Delta t_2 = l_2\sqrt{\epsilon_2}\ Cos\ \theta_r/c\ Cos\ \theta_p$ to traverse $l_2$. The condition for coherent summation of photons at each interface requires:

$$\Delta t = \Delta t_1 + \Delta t_2 + \frac{2\pi r}{\omega} = \quad (5)$$

$$\frac{l_1 \sqrt{\epsilon_1} \cos\theta_r}{c \cos\theta_p} + \frac{l_2 \sqrt{\epsilon_2} \cos\theta_r}{c \cos\theta_p} + \frac{2\pi r}{\omega}$$

where $r = 1, 2, 3 \ldots$ Substituting (4) into (5), one can obtain the resonance or coherence condition for transition radiation (see M. Ter-Mikaelian "Emission of fast particles in heterogenious medium", Nuc. Phys., Vol. 24, pp. 43–66, April, 1961.):

$$\cos\theta_r = \frac{l_1 + l_2}{l_1\sqrt{\epsilon_1} + l_2\sqrt{\epsilon_2}} \left[ \frac{1}{\beta} - \frac{r\lambda\cos\theta_p}{l_1 + l_2} \right] \quad (6)$$

$\theta_r$ is the angle at which the waves, generated at each interface, add in a particular direction. The values of r represent the number of wavelengths of slippage between the emitting electron and the wave from the previous interface. For example, $r = 1$ represents a slippage of one wavelength.

The phase addition results in a conical-radiation pattern shown in FIG. 3. Note that for $r = 0$, one obtains the Cerenkov condition. Cerenkov radiation, therefore, can be viewed as a special case of the transition radiation. Expression (6) will be used in the derivation of the phase-matching condition for the periodic medium loaded free electron laser.

The off-axis radiation pattern does not lend itself easily to stimulated emission since the radiation generated travels away from the electron beam. For stimulated emission or oscillation to occur, the optical and the electron beams must overlap. This can be done by feeding back the radiation to the electron beam with an off-axis resonator or, as in the case of microwave radiation, with a cylindrical waveguide. Another method is to wiggle or spiral the electrons so that the radiation adds along the axis of the wiggler. The present invention uses this method.

In order to derive the phase-matching condition, one should refer to FIG. 6 and assume that the electron is travelling in a helical trajectory with the pitch angle of $\theta_p$. First the effective phase velocity of the wave as the electron travels $(l_1 + l_2)/\cos\theta_p$ will be derived. The wave effectively travels a distance:

$$\Delta x = \frac{l_1 \cos\theta_r + l_2 \cos\theta_r}{\cos\theta_p} \quad (7)$$

for there to be phase addition. Taking the ratio of (7) and (5), the effective phase velocity is:

$$v_p = \frac{\Delta x}{\Delta t} = \frac{c}{\sqrt{\epsilon'}\left(1 + \frac{r\lambda\cos\theta_p}{l_r\sqrt{\epsilon'}\cos\theta_r}\right)} \quad (8)$$

where $\sqrt{\epsilon'}$ is defined to be an average dielectric constant given by:

$$\sqrt{\epsilon'} = \frac{l_1\sqrt{\epsilon_1} + l_2\sqrt{\epsilon_2}}{l_1 + l_2} \quad (9)$$

and $$l_r = l_1 + l_2. \quad (10)$$

Using (9) and (10), the resonance condition (6) can also be simplified:

$$\cos\theta_r = \frac{1}{\sqrt{\epsilon'}}\left(\frac{1}{\beta} - \frac{r\lambda\cos\theta_p}{l_r}\right). \quad (11)$$

This form of the resonance condition is useful for the following derivation of the phase-matching condition.

If a periodic medium is introduced into a wiggler, the phase velocity of the optical wave is still given by (8), and $\theta_p$ will be the pitch angle of the electron trajectory. The ratio of the optical wave's path length to that of the electrons is given by:

$$\frac{\frac{ct}{\sqrt{\epsilon'}\left(1 + \frac{r\lambda\cos\theta_p}{\sqrt{\epsilon'}\, l_r \cos\theta_r}\right)}}{\beta ct} = \frac{\lambda_\omega + \frac{\lambda}{\sqrt{\epsilon'}}}{\frac{\lambda_\omega}{\cos\theta_p}} \quad (12)$$

where $\theta_p$ is now the pitch angle of the electron helical motion in the wiggler. Solving for $\lambda_\omega$, the wiggler period, one:

$$\lambda_\omega = \frac{\beta\lambda\cos\theta_p}{\frac{1}{\left(1 + \frac{r\lambda\cos\theta_p}{\sqrt{\epsilon'}\, l_r \cos\theta_r}\right)} - \beta\sqrt{\epsilon'}\cos\theta_p} \quad (13)$$

Using the resonance condition (11), one obtains:

$$\lambda_\omega = \frac{\lambda\cos\theta_p}{\sqrt{\epsilon'}\,(\cos\theta_r - \cos\theta_p)} \quad (14)$$

This is the fundamental phase relationship for the present invention.

For small angles, equation (14) can be reduced to:

$$\lambda_\omega \simeq \frac{2\lambda}{\theta_p^2 - \theta_r^2} \quad (15)$$

Note that by allowing $$\theta_p \approx \theta_r, \quad (16)$$

the wiggler period can become large, even though $\lambda$ is extremely small for x-ray wavelengths. Satisfying (16) also places the edge of the transition radiation cone down the axis of the wiggler and the optical resonator.

Setting $r = 0$ in equation (13), one obtains the phase-matching condition for the gas loaded free electron laser as given by Fauchet et al.:

$$\lambda_\omega = \frac{\lambda\beta\cos\theta_p}{1 - \sqrt{\epsilon'}\,\beta\cos\theta_p} \quad (17)$$

Setting $\sqrt{\epsilon'} = 1$, and using the formula for the pitch angle from Madey and Deacon "Free electron lasers" in *Cooperative Effects in Matter and Radiation* ed. by C. M.

Bowden, D. W. Howgate, and H. R. Robl, New York: Plenum Pub. Corp., pp. 313-334, 1977.:

$$\sin\theta_p = \frac{a_\omega}{\beta\gamma} = \frac{e\beta\lambda_\omega}{2\pi\gamma mv} \quad (18)$$

where $a_\omega$ is the normalized vector potential, and B is the wiggler magnetic field, one obtains the vacuum free electron laser synchronism condition (see Madey and Deacon):

$$\lambda_\omega = \frac{\lambda\beta\cos\theta_p}{1-\beta\cos\theta_p} = \frac{2\gamma^2\lambda}{1+a^2_\omega}. \quad (19)$$

Thus, the other synchronism conditions are seen as subsets of the more general case of the periodic medium loaded free electron laser, thus substantiating this analytic development. For small $\theta_p$, equation (19) can be written for the vacuum FEL to be:

$$\lambda_\omega = \frac{2\lambda}{\theta_p^2} \quad (20)$$

Comparing (20) with equation (15), the addition of a periodic medium has given another parameter with which to control the wiggler period. For extremely short-wavelength operation the vacuum free electron laser requires the wiggler period to be short for reasonable values of the wiggler magnetic field because the pitch angle is constrained by its phase-matching condition (19) and equation (18). On the other hand, the introduction of a periodic dielectric allows a third variable, the resonance angle $\theta_r$, to be introduced into the phase-matching condition. For the periodic medium loaded free electron laser case where $\theta_p$ is close in value to $\theta_r$, the phase-matching condition (14) allows the helix period to be large. For example, in order to obtain 1200 eV radiation, a wiggler period of $\lambda_\omega = 5$ mm requires a pitch angle of $\theta_p = 2.0 \times 10^{-4}$ for the vacuum free electron laser; however, the resulting calculated gain is too small. For example, using the same photon energy, the addition of a periodic dielectric allows $\lambda_\omega = 1.5$ cm, $\theta_p = 3.5 \times 10^{-3}$, and good gain. Thus, the periodic medium loaded free electron laser will give more physically realizable wiggler parameters without sacrificing gain.

The analysis of the periodic medium loaded free electron laser is identical with the analysis of the vacuum free electron laser, except that the k-vector of the optical wave now has amplitude $$k_{opt} = \frac{\omega}{c}\sqrt{\epsilon'}\left(1 + \frac{r\lambda\cos\theta_p}{\sqrt{\epsilon'}\, l_r\cos\theta_r}\right).$$

Any of the methods used to derive the vacuum free electron laser small-signal gain are applicable. Using the Madey theorem from S. Krinsky, J. M. Wang and P. Luchini, (see "Madey's gain-spread theorem for the free electron laser and the theory of Stochastic processes", J. Appl. Phys., vol. 53, pp. 5453-5458, 1982), the small-signal gain in the case of a helical wiggler is found to be:

$$G \approx \frac{\pi}{4}\left(\frac{e}{mc^2}\right)\left(\frac{\mu_o}{\epsilon_0\epsilon'}\right)^{\frac{1}{2}}\left[\frac{L^3 a^2_\omega(1+a^2_\omega)}{\lambda\gamma^5}\right]\left[\frac{I_0}{A_1}\right]\frac{d}{d_0}\left[\frac{\sin^2\theta}{\theta^2}\right] \quad (21a)$$

$$\theta = \left[\frac{\omega}{\beta c} - \frac{2\pi\sqrt{\epsilon'}}{\lambda} - \frac{2\pi}{\lambda_\omega}\right]\frac{L}{2} \quad (21b)$$

where $I_0$=electron beam peak current, L=interaction length $$a_\omega = \frac{\beta^2\lambda_\omega}{2\pi mc}$$

is the normalized vector potential, and $A_1$=optical mode area; units are MKS.

Comparing gains between the vacuum free electron laser and the present invention shows that the addition of a periodic medium to the free electron laser does not alter the small-signal gain but does change the synchronism condition. The phase-matching condition (14) yields a value for $\lambda_\omega$ which is larger in the periodic medium loaded free electron laser case, which in turn, implies a smaller wiggler field. Thus, adding the periodic medium allows the possibility of physically realizable wiggler parameters for an x-ray free-electron laser.

Assuming $a^2_\omega \gg 1$, and that $$\theta_r \approx \theta_p \approx \frac{a_\omega}{\beta\gamma},$$

then (21a) becomes $$G = 3.12 \times 10^{-4}\left[\frac{L^3\theta_p^4}{\gamma\lambda}\right]\left[\frac{I_0}{A}\right] \quad (22)$$

The gain is seen to increase at $\theta_p^4$; thus, the larger the resonance angle, $\theta_r$, the larger the gain. Incoherent radiation from a stack of randomly spaced foils produces radiation at $\theta \approx 1/\gamma$; however, for the coherent case, $\theta_r$ can be as large as the $\theta_{max}$ given by (3).

A realistic estimate of the gain requires the inclusion of coulomb scattering from atomic nuclei of the foil material. The coulomb scattering results in two detrimental processes: trajectory changes for the electrons and bremsstrahlung losses. Angular divergence results from both the coulomb scattering and the variations in trajectories of the incident electron beam (beam emittance). Such trajectory changes cause the electrons to slip out of phase with the electromagnetic wave. If this slippage is sufficiently large, the gain will diminish.

From T. I. Smith and J. M. J. Madey, ("Realizable free electron lasers," Appl. Phys. B 27, pp. 195-199, 1982.), the angular acceptance of the vacuum free electron laser corresponding to a 90° phase slippage over a total length L is known to be:

$$\Delta\theta_q = \left(\frac{\lambda}{L}\right)^{\frac{1}{2}} \tag{23}$$

A reasonable approximation to the amount of scattering in a length L is given by the rms angular spread due to multiple scattering. From V. L. Highland ("Some practical remarks on multiple scattering", Nucl. Instrum. Methods, 129, pp. 497–499, 1975.), this rms angular spread is given by:

$$\Delta\theta_S \simeq \left(\frac{12}{E}\right)\left[\frac{Ml_2}{X_0}\right]^{\frac{1}{2}} \tag{24}$$

where E is the electron beam energy in MeV, $X_0$ is the radiation length of the foil material, M is the number of foils and $l_2$ is the foil thickness. To minimize the effects of scattering it has been required that $\Delta\theta_s < \Delta\theta_q$. This leads to a maximum allowed interaction length of:

$$L_{max} < \left(\frac{E}{12}\right)^2 \frac{X_0 \lambda}{Ml_2} \tag{25}$$

Lengths larger than this value will substantially diminish the gain. This formula shows that $L_{max}$ varies as the electron beam energy squared. Hence, for equal thickness foils, higher energy beams are less affected by scattering in the foils.

Extremely realivistic-electron-beam energies give wiggler and electron-beam parameters that are most likely to be physically realizable using conventional technology. Such beams provide for larger spacing between foils (formation zones are large), larger interaction lengths, and large electron and optical-beam waists. Ultrarelativistic energies also produce a low emittance electron beam which is required for stimulated emission at x-ray wavelengths.

Photon absorption in the foils and variation in foil thickness can also adversely affect the gain. When losses due to x-ray absorption are included in the calculation for spontaneous coherent emission, the radiation is found to vary as $\exp[-M\mu_2 l_2]$ where $\mu_2$ is the linear absorption coefficient of the foil material of thickness $l_2$, and foil number M. Thus, if the effect of the radiation absorption is to be unimportant it is advisable to require that:

$$M < \frac{2}{\mu_2 l_2} \tag{26}$$

(See M. A. Piestrup, P. F. Finman, A. N. Chu, T. W. Barbee Jr., R. H. Pantell, R. A. Gearheart, F. R. Buskirk, "Transition Radiation as an x-ray source", IEEE. Quant. Elect. QE-19 (1983) 1771.)

When random variation in foil thickness and spacing is large, coherency is destroyed and gain reduced. Garibyan's calculations for spontaneous transition radiation show that if the variation in foil thicknesses satisfies the inequality.

$$2M\left[\frac{\Delta_1^2}{Z_1^2} + \frac{\Delta_2^2}{Z_2^2}\right] < < 1 \tag{27}$$

where $\Delta_1$ and $\Delta_2$ are the standard deviation of foil spacing and thickness, respectively, then coherency is preserved. (See G. M. Garibyan, L. A. Georgyan, and C. Yang, Sov. Phys. JETP vol. 39, p. 265, 1974, and A. N. Chu, M. A. Piestrup, T. W. Barbee Jr., and R. H. Pantell, "Transition radiation as a source of x-rays," J. Appl. Phys. vol. 51, pp. 1290–1293, 1980.)

Thus the standard deviation of the foil spacing should be:

$$\Delta_1 < < \frac{Z_1}{\sqrt{2M}} \simeq \sqrt{2}\,\frac{\lambda\gamma^2}{\sqrt{M}} \tag{28}$$

and foil thickness:

$$\Delta_2 < < \frac{Z_2}{\sqrt{2M}} \simeq \frac{2l_2}{\pi\sqrt{2M}} \tag{29}$$

To satisfy these conditions, variations should be kept to reasonable vaues of 1 to 4 percent. Methods described for the construction of thin foils which have achieved these results are described in M. J. Moran, B. A. Dahling, P. J. Ebert, M. A. Piestrup, B. L. Berman, and J. O. Kephart, "Measurement of Coherent Transition X-Rays". Phys. Rev. Letters, vol. 57, Sept. 9, 1986, and M. A. Piestrup, D. G. Boyers, Qiang Li, M. J. Moran, F. R. Buskirk, J. Neighbours, R. M. Robinson, and D. J. Snyder, "Detection of coherent transition radiation and its application to beam diagnostics and particle identification," IEEE 1987 Nuc. Science Symposium, IEEE Trans. on Nuc. Sci, February, 1988).

Recently scientists at the Lawrence Livermore National Laboratory (LLNL) measured coherent x-rays from polypropylene foils (See M. J. Moran et al.). Previous measurements of the resonance effect only showed interference between the front and back surfaces of single foils. This was the first observation of interfoil resonance which is extremely important for periodic-dielectric loaded free electron laser operation. The interference behavior demonstrates that the transition x-rays are generated coherently by the entire target structure. "Coherent", in this case, refers to the fact that photon generation is a simultaneous response of the entire target stack structure to each incident electron.

Piestrup et al also have observed coherency in the soft x-ray region of 1 to 3 keV for 8-foils of 3.5 $\mu$m mylar separated by 8.5 $\mu$m. The electron beam energy was varied from 63 to 93 MeV. The observed angular radiation patterns were compared to the incoherent cases where the foils spacing was large and random. The results showed that the emission angles for the coherent case were a factor of two larger than the incoherent case ($\theta = 1/\gamma$). Since equation (19) shows that the gain goes as $\theta_p^4$, the gain will be a factor of 16 larger.

These experiments are important for the operation of the present invention because they show that it is possible to construct foil stacks which achieve phase addition between photons at each foil interface. Indeed, the accuracy of the foil spacing and thickness is more important for these lower energy electrons than for the higher energies required for the invention's operation.

One way to increase the gain of the periodic medium loaded free electron laser is to increase the interaction length by increasing the number of foils. This increases the elastic scattering and the loss due to photon absorption, resulting in a decrease in gain. An alternative would be to effectively increase the length of the periodic medium loaded free electron laser by inserting a drift space and making an x-ray klystron. This technique can increase the gain by a factor of 10 or more and minimize the effects of scattering.

The gain derivation derived above for non-ideal electron beams can be extended to include the case of the x-ray klystron. In the klystron, energy modulation of the electron beam takes place in a stack section of M foils which is followed by a drift distance equivalent to $N_d$ foils. Most of the density modulation, or bunching, of the electron beam takes place in the drift space, allowing energy extraction in a final wiggler section composed of an additional N periods.

Using the analysis by P. Elleaume in "Theory of the Optical klystron," Nuclear Instruments and Methods in Physics Research, vol. A250, pp. 220-227, 1986 the gain is found to be:

$$G_{kly} = .926 \left( 1 + \frac{N_d}{M} \right) G_{fel}, \quad (30)$$

where $G_{fel}$ is the original periodic medium loaded free electron laser gain calculated by equation (22) for 2M foils. The maximum value of $N_d$ is determined by the maximum value of phase slip between electrons in a bunch which are diverging due to the angular elastic scattering of the electron beam in the foils, $\theta_s$; the electron beam emittance, $\epsilon$; and the electron beam energy spread, $\Delta E/E$. Since these three terms are random, they add in quadrature. Thus, the total phase spread is given by:

$$-\phi = \frac{2\pi L}{\gamma^2 \lambda} \left[ \left( \frac{\Delta E}{E} \right)^2 + \left( \frac{\epsilon_n^2}{2\pi^2 r_0^2} \right)^2 + \left( \frac{\gamma^2 \theta_s^2}{2} \right)^2 \right]^{\frac{1}{2}} \quad (31)$$

where $\epsilon_n = \gamma \pi \epsilon$ is the normalized electron beam emittance.

The maximum drift distance or the maximum value of phase slip that can be tolerated for $N_d/M >> 1$:

$$\frac{N_d}{M} \leq \frac{1}{2-\phi} \quad (32)$$

From equation (30) this limit determines the maximum gain that can be achieved from the periodic medium loaded klystron:

$$G_{kly} = \left( \frac{0.926}{\sqrt{2}} \right) \left( \frac{1}{2-\phi} \right) G_{fel} \quad (33)$$

The x-ray klystron appears to be the most preferred embodiment of the periodic medium loaded free electron laser to produce sufficient gain to work at ultra-soft x-ray wavelengths, while the periodic medium loaded free electron laser using ultra-relativistic electrons gives more appropriate values for hard x-ray frequencies. The electron-beam energy of the klystron was also significantly lower than that of the periodic medium loaded free electron laser. The klystron gives the largest gain while minimizing the number of foils needed. This minimizes the loss per pass due to foil absorption of the X-rays and minimizes the trajectory changes and thermalization of the electrons due to collisions.

Those skilled in the art will understand that there are many equivalent variations of the above described invention; hence, the invention should not be considered limited to the described embodiment but should be interpreted in light of the appended claims.

I claim:

1. An apparatus for generating and amplifying electromagnetic radiation comprising:

beam means for generating and directing a relativistic electron beam along an axis, said beam having an energy greater than 1 MeV and having a velocity defined thereby;

housing means for providing a controlled environment for providing a vacuum for said electron beam;

deflection means along said axis for periodically deflecting said electron beam transversely of said axis, said deflection means producing a transverse and rotating magnetic field so that the path of electrons in the electron beam is helical with a helical pitch angle of $\theta_p$ when in said magnetic field, said magnetic field hereinafter called the wiggler field and having a period $\lambda_\omega$; and phase means for spacially periodic production of said electromagnetic radiation, said electromagnetic radiation having a phase velocity, and for spacially periodic alteration of the phase velocity of said electromagnetic radiation along said axis, said phase means comprising a medium of periodically varying density of period $l_r$ and an average index of refraction $n'$ along said path which possesses a resonance angle $\theta_r$ defined by the relationship $$\cos \theta_r = \frac{1}{n'} \left( \frac{1}{\beta} - \frac{r\lambda \cos\theta_p}{l_r} \right),$$

where r is an integer, $\beta$ is the ratio of the velocity of the electrons in the electron beam to the velocity of light in a vacuum, and $\lambda$ is the wavelength of the electromagnetic radiation;

said deflection means and said phase means coordinated to establish a periodic phase-match condition between the phase velocity of said electromagnetic radiation and the velocity of said electron beam so that there is a net gain of said electromagnetic radiation at said wavelength $\lambda$ said electromagnetic radiation travels travel said electron beam, said coordination being accomplished by adjusting the helical pitch angle $\theta_p$ of the electron beam in the wiggler field, and the resonance angle $\theta_r$ such that said phase matching condition is satisfied, said phase matching condition being defined by the following equation:

$$\lambda_\omega = \frac{\lambda \cos\theta_p}{n'(\cos\theta_r - \cos\theta_p)}.$$

2. An apparatus according to claim 1, wherein said deflection means comprises a plurality of linearly arranged successive magnets for generating a magnetic field of alternating polarity to periodically deflect the electrons in said beam about a straight line path defined by said axis.

3. An apparatus according to claim 1, wherein said deflection means comprises a plurality of groups of periodic deflecting elements whose spacing between groups is much greater than the period of the deflecting means.

4. An apparatus according to claim 3, wherein said periodic medium is broken into two or more groups of foils separated by distances much greater than the foil spacing period.

5. An apparatus according to claim 1, wherein said periodic medium comprises alternating planar foils positioned periodically along said axis, and separated by a vacuum.

6. A apparatus according to claim 1, wherein said periodic medium is comprises two alternating planar foils of differing density positioned periodically along said axis.

7. An apparatus according to claim 1, wherein said periodic medium comprises alternating planar foils positioned periodically along said axis, and separated by a gas.

8. An apparatus according to claim 1, wherein said periodic medium comprises a plasma of alternating density along said axis.

9. A apparatus according to claim 1, including mirrors that define an electromagnetic radiation cavity with the said path.

10. An apparatus according to claim 1, wherein said periodic medium comprises foils whose spacing is such that the spacing is nonuniform and compensates for the electron beam loss due to radiation, and results in optimum gain.

11. An apparatus according to claim 1, including means for injecting a beam of electromagnetic radiation into the electron beam for amplification of the electromagnetic radiation.

* * * * *